United States Patent [19]
Greiner et al.

[11] Patent Number: 5,437,123
[45] Date of Patent: Aug. 1, 1995

[54] UNDEROXIDIZED BURNER UTILIZING IMPROVED INJECTORS

[76] Inventors: Leonard Greiner, 1310 Logan Ave., Suite E, Costa Mesa, Calif. 92626; David M. Moard, 1545 S. El Molino Ave., Pasadena, Calif. 91108; Bharat Bhatt, 1454 Roberta Ave., Fullerton, Calif. 92633

[21] Appl. No.: 309,041

[22] Filed: Sep. 20, 1994

Related U.S. Application Data
[63] Continuation-in-part of Ser. No. 148,472, Nov. 8, 1993.
[51] Int. Cl.6 ............................................. C10G 9/04
[52] U.S. Cl. .................................... 48/107; 431/216; 431/171; 48/102 A
[58] Field of Search .................. 431/8, 215, 216, 171, 431/172; 48/102 A, 107, 113, 117

[56] References Cited
U.S. PATENT DOCUMENTS

| | | | |
|---|---|---|---|
| 1,543,776 | 6/1925 | Johnson | 431/172 |
| 2,097,153 | 10/1937 | Greenawalt | 48/107 |
| 2,220,603 | 11/1940 | Hirtz et al. | 431/171 |
| 4,701,123 | 10/1987 | Tallman et al. | 431/172 |
| 5,002,481 | 3/1991 | Forster | 431/4 |
| 5,207,185 | 5/1993 | Greiner et al. | 123/3 |
| 5,299,536 | 4/1994 | Moard et al. | 123/3 |

*Primary Examiner*—Carroll B. Dority
*Attorney, Agent, or Firm*—Albert M. Herzig

[57] ABSTRACT

Injectors are disclosed for use in an underoxidized burner having a single or double stage internal combustion chamber for receiving gaseous or liquid fuel such as diesel for mixture with air or oxygen and subsequent ignition by a spark plug. The injector includes feed conduits or tubes for simultaneously conducting air and fuel to a mixing device having a baffle arrangement against which separately injected air and fuel impinge causing a complete air/fuel blending which is ignited, burned and exhausted. The injector may accept effluent gases for mixing with water to produce maximum hydrogen $H_2$ from fuels. A lamina flow is produced which is folded over and reversed in direction within the combustion chamber.

9 Claims, 4 Drawing Sheets

UNDEROXIDIZED BURNER UTILIZING IMPROVED INJECTORS

This application is a continuation-in-part of application Ser. No. 08/148,472 filed Nov. 8, 1993.

BACKGROUND OF THE INVENTION

1. Field of the Invention

This invention relates to the field of apparatus for reducing nitrogen oxide emission from internal combustion engines and turbines or hydrogen generation in general, and more particularly injector mixture device for receiving separate air/fuel mixtures within a combustion chamber and to which water may be added to the combusted effluent to increase the production of hydrogen.

2. Brief Description of the Prior Art

Normal burners operate air rich with fuel in a combustion chamber and react in roughly two stages. The first stage includes regions with air/fuel ratios near stoichiometric wherein high temperatures occur that induce initializing chemical reaction with fuels. Such temperatures result in high concentrations of nitrogen oxide $NO_x$. The second stage operates air rich to achieve final overall air/fuel ratio. Its temperature is lower but often not sufficiently low that $NO_x$ cannot form, and this stage generally does not remove $NO_x$ formed in the first stage. The overall result is that $NO_x$ formed in both stages appears in the burner exhaust.

In co-pending U.S. patent application Nos. 08-148,472 and 07-997,450, technology was disclosed for attaining chemical equilibria between air and a large excess of fuel in an underoxidized burner through a process whereby the air-fuel mixture undergoes certain rapid flow reversals. The technology results in equilibration at a reasonably high temperature without resulting in formation of $NO_x$, since its excessive fuel concentration preferentially causes reaction between air and fuel instead of $N_2$.

It has been found that the technology of the copending patents results in products that are easily combusted with further air. As a consequence, a combustor with excess air for powering engines or for heating boilers, etc. which produces virtually zero $NO_x$ can be achieved by a related two stage process. The first stage comprises a fuel-rich burner of the type taught in the co-pending patents. The second stage uses similar technology but operates air rich. Products from the first stage and the excess air needed to attain the final air-fuel mixture are introduced into the second stage. In this stage, a mixture of the latter air and latter products undergo the same rapid flow reversals taught by the technology of the co-pending patents, which results in their rapid chemical equilibration. In view of the improved intrinsic reactivity of the fuel products obtained from the underoxidized burner, the induced flow reversals, and the relatively high concentration of hydrogen, equilibration can be induced in the second stage at higher ratio of air/fuel than normally used. This results in very low temperatures where $NO_x$ formation is very low. At higher air/fuel ratios where temperatures are higher, the technology also results in relatively low $NO_x$ because the air and fuel are very rapidly mixed so very high temperatures are largely avoided.

To attain needed conditions in the second stage, its injection is modified from those of the previous patents. This modification is necessary because the temperature of the underoxidized burner products can cause preignition therein whose effects are to lower the overall tendency to equilibrate and produce internal temperatures that are high enough to harm the injector. The change isolates the new air and first stage products from each other while within confined spaces of the injector.

Therefore, a long-standing need has existed to provide a novel injector for combining air/fuel into a volatile mixture which after combustion, may have water introduced thereto in order to produce additional hydrogen. Such a means of injection should be simple to manufacture and install into a combustion chamber of a $NO_x$ burner and preferably, the effluent at the exhaust nozzle may receive water injection.

SUMMARY OF THE INVENTION

Accordingly, the above problems and difficulties are avoided by the present invention which provides a novel burner having at least one combustion chamber in which fuel and air are introduced via feed tubes whereas the conducted air and fuel are forced into impingement with a barrier in a thimble which not only induces the fuel and air into a mixture but reverses flow so that the mixture forms a lamina flow by folding over upon itself about the feed tubes and by means of direction reversal in the combustion chamber. Ignition means are provided for combusting the thoroughly mixed air and fuel and the exhaust is directed through an exhaust nozzle which may include means to inject water into the effluent.

Therefore, it is among the primary objects of the present invention which provides means for increasing hydrogen from fuels, via an underoxidized burner, through the addition of water. Such a means of water addition reduces carbon formation.

Another object of the present invention is to provide an underoxidized burner which produces maximum hydrogen from fuels and reduces carbon which forms a solid powder that would normally interfere with many of the operational processes.

Another object of the present invention is to provide an underoxidized burner employing novel injectors for effecting very fast premixing of feed, air or oxygen and fuel by bringing the fuel and oxygen together immediately prior to injection into a combustion chamber where the mixture is then ignited and burned. Such a mixing process occurs rapidly so that pre-reaction in the injector does not have time to occur.

Yet another object of the present invention is to provide novel injectors for an underoxidized burner wherein the fuel contains a very high temperature mixture of carbon monoxide and hydrogen which is produced by the underoxidized burner as a first stage and which normally would spontaneously and rapidly react with air or oxygen. If permitted, such pre-reaction can be destructive and result in unintended products.

Another object of the present invention is to provide an underoxidized burner for producing maximum hydrogen from fuels which can be increased by adding water preferably at the burner exit stage.

A further object resides in providing an underoxidized burner using liquid fuels resembling diesel oil or other liquid fuels.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
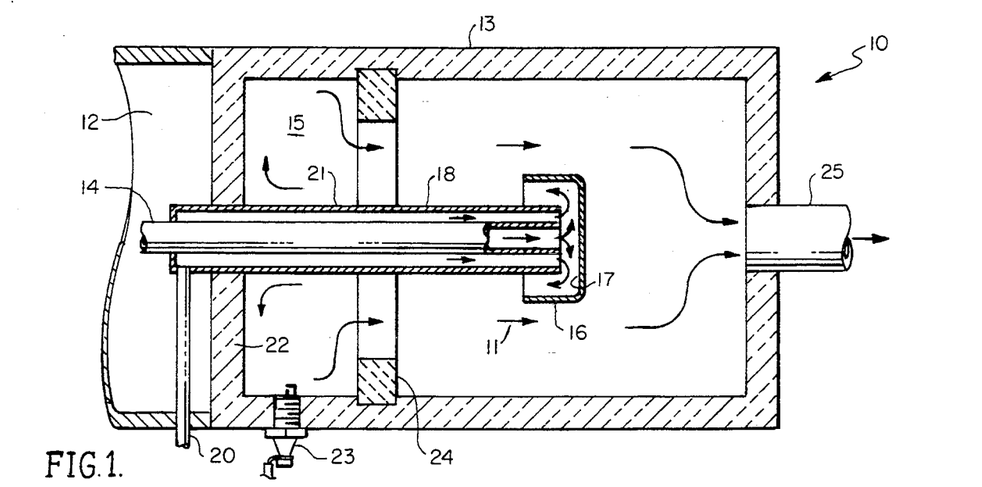
FIG. 1 is a diagrammatic longitudinal cross-sectional view of a two-stage underoxidized burner employing the novel injector incorporating the present invention.

Referring to FIG. 1, the novel two-stage underoxidized burner of the present invention is illustrated in the general direction of arrow 10 which is provided with a novel injector represented by numeral 11. The burner includes a first stage 12 and a second stage 13. A conduit 14 is a down stream section of the underoxidized burner 12 which is located so that its hot effluent passes through the tube or conduit 14 and eventually into the second stage or secondary burner 13. The conduit or pipe 14 enters a combustion chamber 15 within the second stage burner 13 and the pipe or tube 14 ends in fixed spaced-apart relationship with respect to the flat surface of the interior of a thimble 16. The flat surface is identified by numeral 17 and it can be seen from the arrows that the effluent through tube 14 enters into the space between the end of the tube and the opposing surface 17 so that impingement occurs and redirection 180 degrees for exit through the opening of the thimble. As illustrated, the thimble 16 is cup-like and the tube 14 is inside an air-conducting tube 18 in coaxial spaced-apart relationship. Air flow sufficient to provide a desired overall stoichiometric air fuel ratio including the fuel and air of the underoxidized burner, passes via pipe 20 into an annulus 21 defined between the opposing surfaces of the coaxially disposed tubes 14 and 18. The lower end of the annulus 21 is sealed to the insulated end 22 and the top of the annulus is open within the space of thimble 17. Gasses from the inlet or feed pipe 14 and air from the feed pipe 18 meet and mix within the thimble 17, as illustrated by the air flow arrows. The air and fuel mixture then undergoes two 90 degree turns which result in a thorough mixing, before exiting as a gas cylinder that moves rearwardly along the outside of tube 18. Such a mixture cylinder represents a lamina flow which is folded over and then reversed within the combustion chamber 15 where it is ignited by a sparkplug or similar ignitor, as indicated by numeral 23. On moving through the combustion chamber, the gas-like cylinder inducts gasses from the burner 15 which results in recirculation. The gasses then impinge against wall 22 and eventually at the other burning wall that results in two further 90 degree turns which promote additional mixing. The gasses move axially upwardly towards and through the combustion chamber and encounter a barrier ring 24, fabricated of an insulating material. This causes the gasses to move towards tube 18 which aids the induction-recirculation action. Finally, the hot gas products pass through the remainder of the burner and exit at orifice nozzle 25. Tests have shown that almost double combustion efficiency is achieved with the separate flows, as well as very low $NO_x$ and CO emissions.

Figure 2:
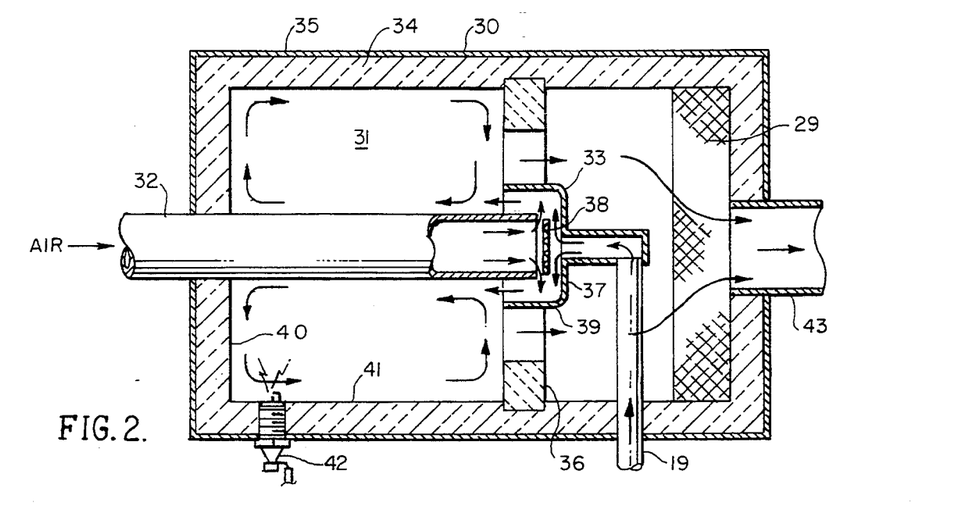
FIG. 2 is a view similar to the view of FIG. 1 incorporating a single-stage underoxidized burner having a novel injector and further including water injection at the burner exit.

Referring now in detail to FIG. 2, another version of the present invention is illustrated showing an injector for effecting very fast pre-mixing of the fuel and air feed used in the underoxidized burner. The burner is illustrated by numeral 30 and includes a single stage with the combustion chamber identified by numeral 31. Air and fuel are brought together via tubes 32 and 19 respectively prior to injecting into the combustion chamber 31 where the feeds are then ignited and burned. The mixing process occurs very rapidly so that pre-reaction in the injector, broadly indicated by numeral 33, does not have time to occur. The injector is particularly used when the fuel contains a very hot mixture of carbon monoxide and hydrogen, such as produced by the effluent of the underoxidized burner as a first stage, as described in FIG. 1, which normally would spontaneously and rapidly react with air. Such pre-reaction can be destructive and result in unintended products.

The burner 30 is enclosed by insulation 34 within a metal enclosure 35. A ceramic ring 36 protrudes into the combustion chamber 31 and is attached to the inner insulation 34. Fuel enters tube 32a and moves to a cup-like thimble 37 forming a part of the injector 33. When entering the interior of the thimble 37, the fuel encounters a barrier 38 against which the fuel impinges so that the fuel is moved outwardly in a radial manner to the cylindrical sidewall interior of the thimble 37 wherein the sidewall is represented by numeral 39. Air enters tube 32 and exits through its open end so as to impinge on the opposite side of barrier 38 from the side impinged by the fuel. As a result, the air is forced into the interior sidewall 39 of the thimble. Here, the fuel/air combination undergoes a 90 degree directional change causing initial mixing. While passing within the cylindrical portion of the thimble sidewall 39, aerodynamic and momentum effects cause the mixture to squeeze together into a thin sheet-like vapor that, in effect, further induces mixing. The mixture leads the thimble through its opening and the mixture caused by aerodynamic forces plus the Coanda effect attaches itself as a compressed relatively thin lamina to the outside of the air input tube 32. This results in further mixing while also protecting tube 32 from very hot combustion temperatures. The downward moving lamina eventually encounters bottom or end insulation surface, identified by numeral 40, where the lamina is turned 90 degrees and then moves to inside sidewall 41 where a further directional change is induced. Both changes aid mixing of the fuel and air. The mixture is ignited by a sparkplug 42. The burning gasses move upwardly towards the opposite end of the combustion chamber and generally fills the bottom portion of the burner. A portion of hot gasses within the combustion chamber is inducted into the downward lamina from thimble 37 causing recirculation that aids combustion. Such induction is increased by ceramic ring 36 which directs the exiting hot gasses to tube 32.

Eventually, the burned products or effluent leave via nozzle 43. After ignition, the spark is not needed and is shut off.

It is to be particularly noted that the mixture flow is indicated by the arrows as well as air and fuel flow exiting via the open ends of the respective tubes 19 and 33. Also, it is to be noted that the input feed tubes 32 and 33 are coaxially disposed with respect to one another, as shown in FIG. 1; however, the feed tubes in FIG. 2 are coextensive with one another, having the thimble 37 carried on the end of fuel feed tube 33. In FIG. 1, the thimble 16 of the injector can readily be carried on the tube 18 via spokes or in any other conventional manner, as previously disclosed in co-pending applications.

Figure 3:
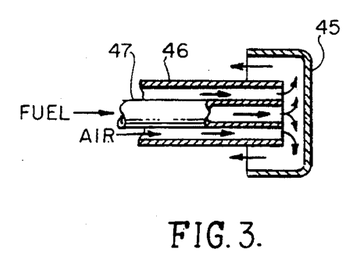
FIGS. 3, 4 and 5 illustrate versions of the novel injector useful in the underoxidized burners shown in FIGS. 1 and 2.
Figure 4:
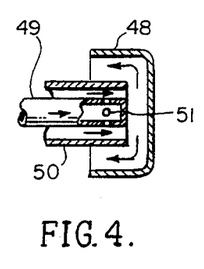
Figure 5:
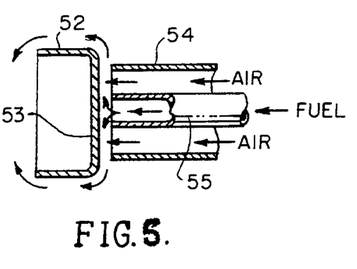

In FIGS. 3, 4 and 5, different arrangements of thimble location and air/fuel introduction to the thimble is disclosed. In FIG. 3, the thimble 43 is arranged so that its opposing face is directly opposite the open ends of air feed tube 46 and fuel feed tube 47. The mixture of the fuel/air feeds is as described with respect to injector 33 shown in FIG. 2, with the exception that the barrier 38 is not used. However, the embodiment shown in FIG. 3 may be used in the second stage of the double stage underoxidized burner shown in FIG. 1. With regard to FIG. 4, another version of injector is employed whereby the thimble 48 accepts the open ends of the fuel feed tube 49 and the air feed tube 50, as previously described. However, the end of fuel feed tube 49 is closed and the fuel is introduced to the thimble and air feed via holes placed in the sidewall of the tube adjacent its closed end. Such a hole is indicated by numeral 51. Still another version of injector is illustrated in FIG. 5 in which the thimble has been reversed so that its base of plate 53 has an external surface against which the air and fuel feed is impinged. The air feed tube 54 and the fuel feed tube 55 are coaxially disposed with respect to one another in fixed spaced-apart relationship so that the air feed will be conducted along the external surface of the fuel tube 51. However, the discharge of both air and fuel is through the open ends simultaneously for impingement against the external surface of plate 53. The mixed flow will pass around the external sidewall of the thimble into the combustion chamber to form the lamina flow, as previously described.

The variation of injectors shown in FIGS. 3, 4 and 5 may be used in the burner shown in FIG. 2 whereby fuel may enter from the bottom instead of from the top which more readily simplifies system construction. In FIGS. 3 and 4, air and fuel enter upwardly via the feed tubes 46 and 47, respectively. In FIG. 3, the air and fuel feeds reach the inside of thimble 45 and the two feed flows impinge on the interior of the thimble and are forced sideways, resulting in conditions which resemble those shown in FIG. 2. In FIG. 4, only the fuel tube portion of the injector is provided with discharge orifices or passageways 51. Here, the fuel leaves tube 49 via the orifices that are provided near the closed top end of the tube. The fuel then enters the air flowing from feed tube 46, as described previously. This type of injector is best used when fuel, such as methane, is not extraordinarily reactive with air.

Regarding the embodiment shown in FIG. 5, a variation of the injector is disclosed. In this variation, air from tube 54 and fuel from tube 55 impinge on the outside of the thimble 52 by impinging against the surface of bottom plate 53. In this version, the Coanda effect causes the two feed streams to attach to the outside cylindrical portion of the thimble as a thin lamina, inducing a squeezing effect that causes mixing. Aerodynamic effects on the material leaving the thimble cause the stream to move inward onto itself to form a downwardly moving stream of relatively small diameter, causing further mixing.

The injectors disclosed may include the pre-heat means for pre-heating the feed to the high temperature required to effect the underoxidized reaction, as described in previous patent applications. In this regard, the co-pending application includes several methods which may be used to pre-heat the air/fuel feeds in order to salvage energy. However, an additional pre-heating means is shown in FIG. 6 which may be used with any of the injectors disclosed herein.

Figure 6:
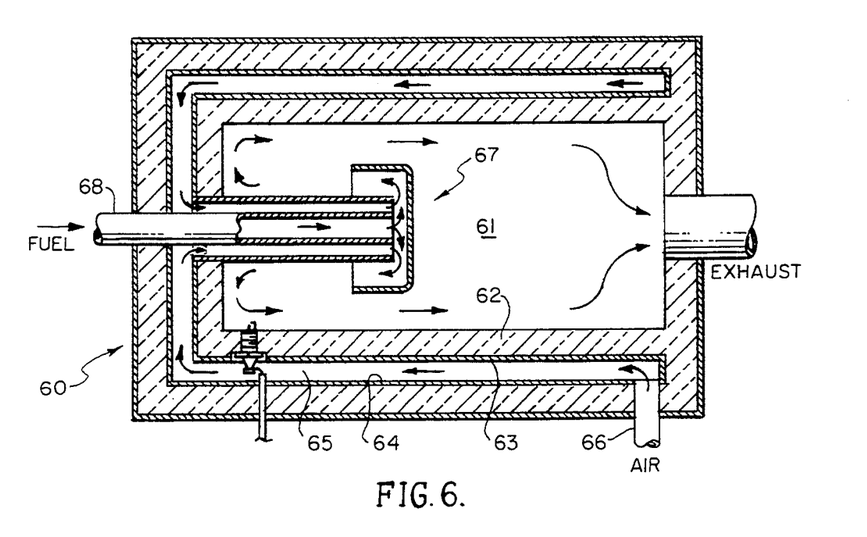
FIG. 6 is a longitudinal cross-sectional view of an underoxidized burner suitable for handling liquid fuels such as diesel.

Referring now in detail to FIG. 6, an underoxidized burner employing the novel injector with pre-heating means is illustrated in the general direction of arrow 60. The burner includes a combustion chamber 61 which is enclosed by insulation 62 within a metal wall 63. This wall is enclosed in spaced-apart relationship by a metal wall 64 which defines a space 65 between the opposing surfaces of the space-apart metal walls 63 and 64. Feed air is introduced into annular space 65 via feed tube 66 and the air moves downwardly. At the lower end of the burner, the air enters an injector, illustrated in the general direction of arrow 67, of the type shown in FIG. 3. Fuel is introduced to the air at the injector 67 via feed tube 68. Both the fuel and air feeds are mixed within the thimble of the injector, as previously described. By employing this construction, energy is reclaimed which is normally lost through insulation. This construction also decreases loss of energy through the insulation because the temperature of the outer metal wall 64 is reduced from about 2900 degrees Fahrenheit in the burner to that of the 78 degrees Fahrenheit to 1100 degrees Fahrenheit of the feed air.

The various versions of injectors disclosed herein maintain the fuel and air feeds separate prior to rapid mixing which permits the fuel to be heated separately, or not at all. This advantage permits usage of relatively heat sensitive fuels. Thus, diesel oil tends to decompose to components including carbon, which are difficult to burn, if heated too much above its boiling point of about 650 degrees Fahrenheit.

The following discussion will be related to FIG. 6 but will emphasize the ability of the underoxidized burner to use liquid fuels resembling diesel oil or liquid fuels. In this connection, liquid fuels must first be vaporized for use in the underoxidized burner. Analysis and experiments indicate that almost all such fuels are thermodynamically unstable and tend to decompose near boiling points to materials as solid carbon. This material is difficult to burn cleanly and also results in various hydrocarbons. Furthermore, relatively high boiling liquids tend to "chug" when vaporization is achieved by passage through heat exchanger tubes heated by an external flame which results in uneven burning. Also, heat exchange tubes have high pressure drops which are undesirable for burners. In order to avoid these problems and provide a more universal injection system, concepts of the present invention may be used. The fuel is vaporized external to a heat exchanger tube while surrounded by the hot input or feed air flow. This produces the desired intimate mixture of air and fuel immediately on vaporization without undergoing pulsing or the well known "chug".

In employing the embodiment of FIG. 6 to handle liquid fuels such as diesel oil, the liquid fuel is introduced from the lower or bottom end of the burner via a small tube that exits very close to the inside bottom of the thimble as shown. Feed air enters the larger tube surrounding the fuel tube, and the high temperature of the air results in heat exchange to the liquid fuel which raises the temperature of the fuel depending upon the particular fuel used. The exiting fuel impinges onto the thimble, causing the liquid to move axially outwardly and then down the side of the thimble. When the mixture exits the thimble, aerodynamic forces direct it to the outside of the standpipe wall of the injector. Air from the outer annulus will also be caused by the thimble to move down the injector wall. Further heat exchange takes place both from the hot gasses through the standpipe wall and also from the external flame, raising the liquid temperature to boiling. The vapors so produced enter the surrounding air layer without decomposing since the air touches the liquid fuel, so the likelihood of obtaining higher temperatures where carbonization can occur is avoided. The vaporized fuel/air mixture moves down the wall of the injector forming the homogeneous mix needed for equilibrium reaction, as aerodynamic forces squeeze the two together. On reaching the bottom, the mixture is ignited and burned in the manner previously described.

A purpose of the underoxidized burner is to produce maximum hydrogen, $H_2$, from fuels. This can be increased by adding water, as next discussed with regard to FIGS. 2, 7–11 inclusive.

To achieve equilibration without catalyst, the normal underoxidized burner combustion temperature is high, so considerable CO forms. This can be exploited and further hydrogen formed through the well-known shift reaction between carbon monoxide (CO) and water ($H_2O$) to produce $H_2$ and carbon dioxide ($CO_2$), viz: $H_2O + CO = H_2 + CO_2$.

The latter is favored by low temperature and high $H_2O$ concentration. Catalysts are normally used, and the catalytic shift reactor 29 shown in FIG. 2, downstream of the underoxidized burner is a part of the technology of this disclosure.

Figure 8:
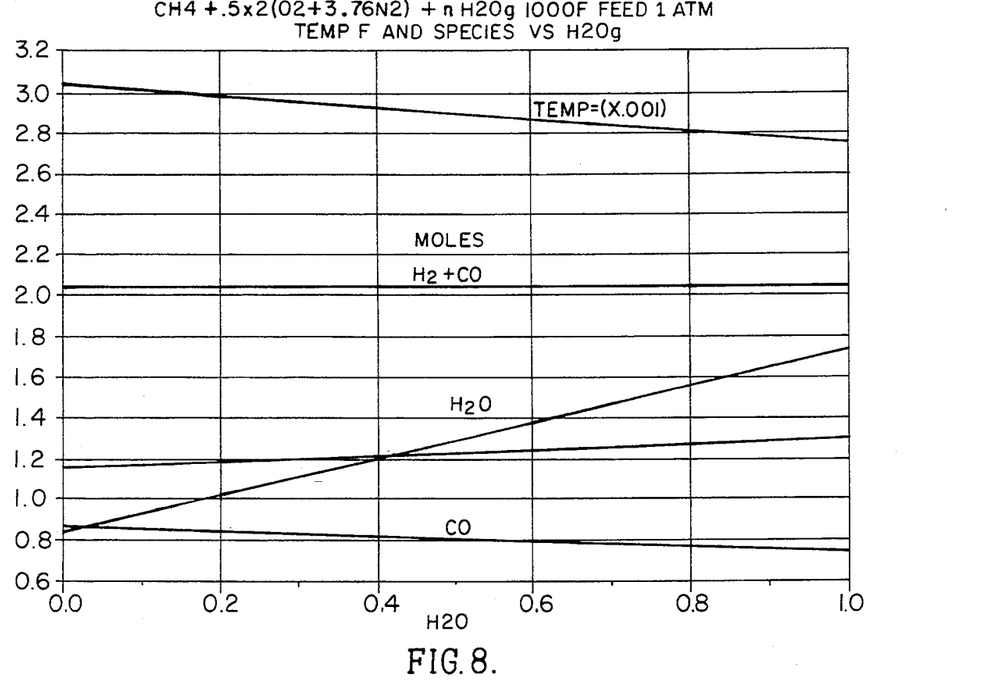
FIGS. 8 and 9 are charts pertaining to the addition of water to an underoxidized burner in order to increase hydrogen output.

Because the underoxidized burner's thermal output is relatively high, its combustion temperature remains high even when considerable water is added. This is indicated in FIG. 8 for the reaction, $CH_4 + 0.5 \times 2(O_2 + 3.76N_2) + n\ H_2O(g)$ for n from 0 to 1, with all reactants, including water, heated to 1000° F. by exchange from the combustion gases. The combustion temperature drops from slightly above 3000° F. to slightly below 2800° F.—the latter is still ample to bring about equilibration in an underoxidized burner. Thus, a part of the water for the shift reactor can be added directly into the underoxidized burner along with the air and fuel.

At this high combustion temperature, water addition results in a small increase in $H_2$ from about 1.2 to 1.3 moles per mole of $CH_4$ feed. However, it is the temperature at the exit of the underoxidized burner which controls the shift reaction and not the combustion temperature. This temperature is much lower because of heat exchange between feed and burning gases, and it approaches the temperature obtained for reaction with all input feed at room temperature.

Figure 9:
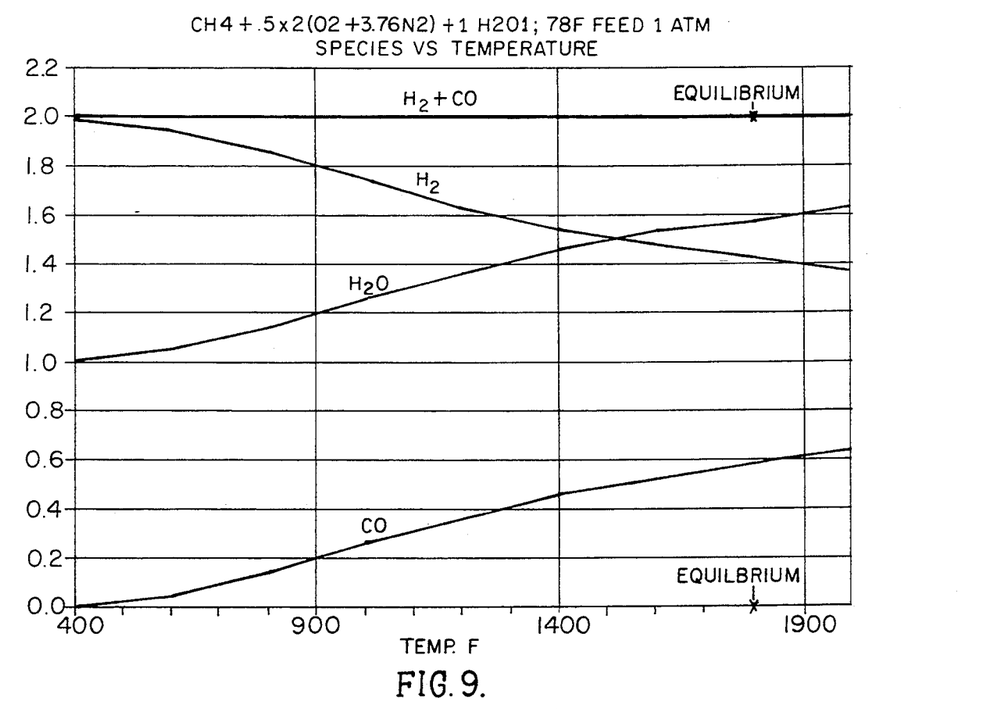

FIG. 9 has data with all feed, including liquid water, entering at 78° F. for the highest water content of FIG. 8 of 1 mole. These conditions relate closely to those at the underoxidized burner exit. Equilibrium for the reaction is at about 1820° F., where 1.6 moles of hydrogen per mole of methane is produced. This is much more than at the high temperature underoxidized burner reaction, amounting to 80% of the hydrogen in the methane fuel.

The Figure also shows chemical equilibrium conditions at lower temperatures, as caused by heat exchange to the environment. Here, because sufficient water was added to the main underoxidized burner reaction, the hydrogen output continues to increase to its maximum as the temperature decreases by heat exchange to an environment of 400° F.

Cooling by exchange to the environment by simple loss of heat often results in carbon formation. This is because at intermediate temperatures below about 1800° F. achieved during cooling, CO is thermodynamically unstable via the reaction, $CO + 0.5C + 0.5CO_2$. At much lower temperatures, below about 600° F., this reaction is very slow and normally can be ignored.

The most desirable point to add water is to the feed stream to the main reaction. This is because its presence while passing through intermediate temperatures during the cooling process, results in the shift reaction which alleviates the need for catalysts in a later low temperature condition and also generally prevents carbon formation. A problem which must be addressed, however, is the decrease in temperature of the underoxidized reaction when water is added.

Figure 10:
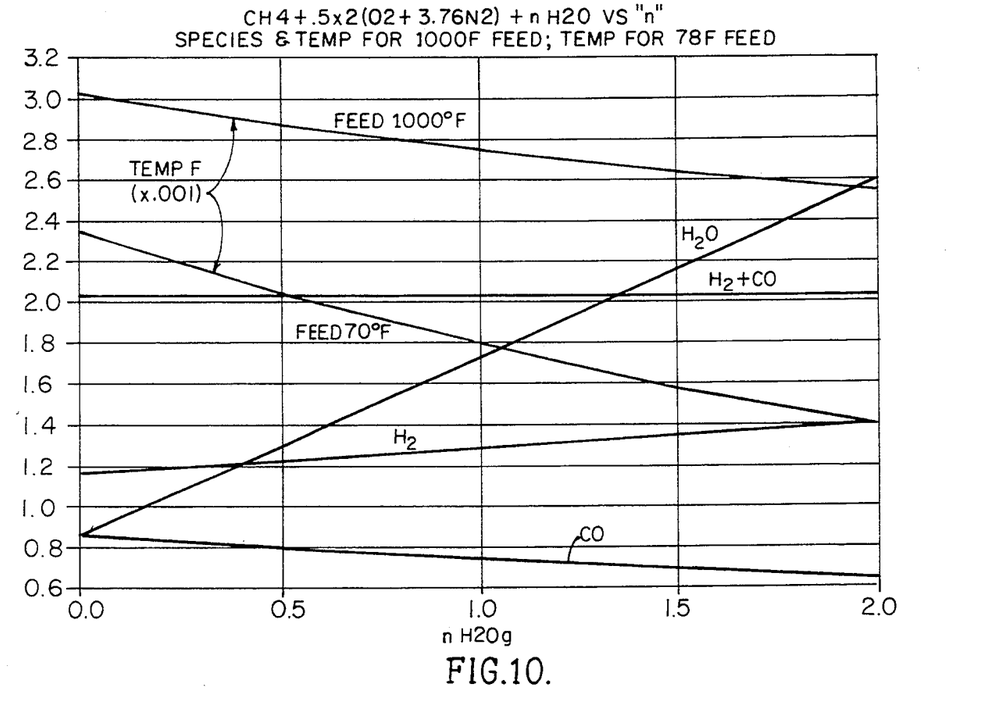
FIGS. 10 and 11 are charts relating to the addition of water to an underoxidized burner to increase hydrogen output with reduction of carbon formation.

This effect is indicated in FIG. 10 which resembles FIG. 8, for the formulation $CH_4 + (O_2 + 3.76N_2) + n\ H_2O$, which represents reaction with 50% stoichiometric air and with up to two moles further water added. The two top curves are combustion temperatures. The lower is for feed introduced at 78° F., where temperatures produced are from about 2300° F. with no water and 1400° F. with two moles water. These are too low to guarantee equilibration. The upper curve is for feed at 1000° F., using the preheat methods which are subjects of previous patents. Here, temperatures are 3000° F. to 2550° F. with two moles water. These are sufficient to bring about the desired equilibration.

Equilibrated species are also shown in FIG. 10. $H_2$ increases from 1.2 to 1.4 moles with increasing water, while $H_2 + CO$ is more or less constant at about 2 moles. The latter represent ideal results after the shift reaction. Note that the significant temperature for the shift reaction is that at the exit of the UOB and not the higher combustion temperature.

Figure 11:
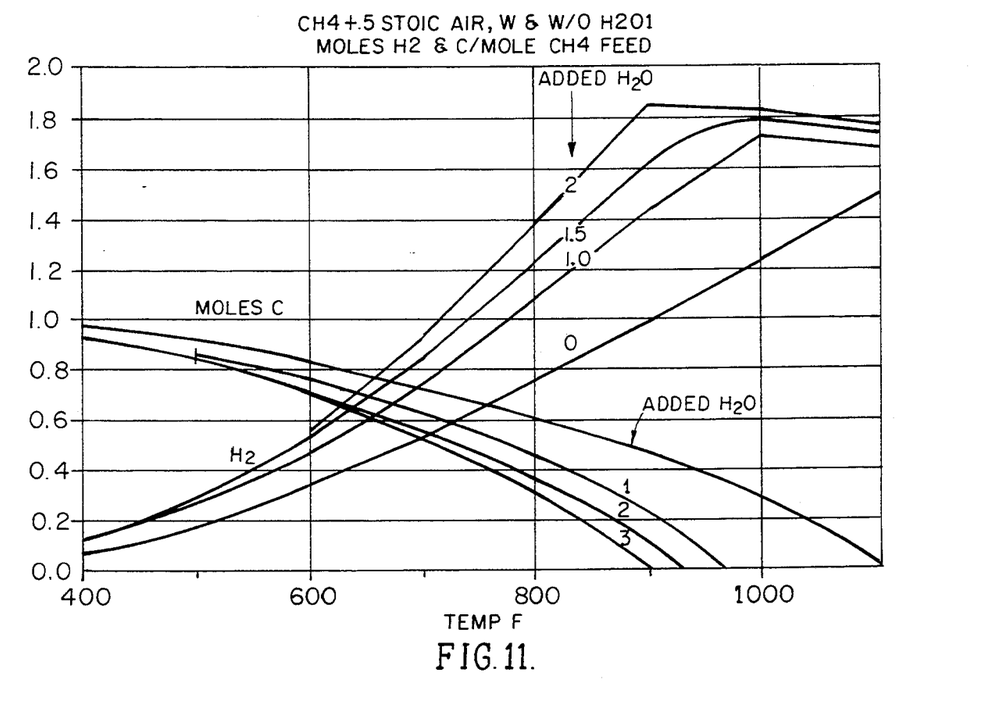

FIG. 11 has moles of $H_2$ and C at exhaust temperatures between 400° F. and 1100° F. with 0 to 2 moles added water. The bottom curves show C to decrease virtually to nil with water. Below about 600° to 900° F. experience suggests the rate of C formation from dissociation of CO is very small, so less C than indicated by equilibration will form. In any event, at 2 moles water and 900° F., C is virtually not present.

The upper curves of FIG. 11 are hydrogen output. These approach the theoretical 2 moles of FIG. 10 at the higher water content. Note, this is accomplished without catalysts.

Theoretical temperatures for the underoxidized burner are given in FIG. 10 for feed temperatures of 78° F. These exceed those of FIG. 11. Thus for two moles of water, the theoretical exhaust temperature is 1400° F., while FIG. 11 suggests need to decrease to 900° F. Experiments show that about half the needed decrease normally occurs from burner heat loss to the environment. Additionally, because the temperature is now sufficiently low that C formation is not likely, water can now be added to the downstream exhaust. Doing so, will both lower the temperature and tend to increase $H_2$ to the theoretical 2 moles.

Injector-mixers of the types previously described can effect mixing of water (or steam) with the effluent from an underoxidized burner so rapidly that the mixture of the two will pass through the temperature regime where carbon forms. It then moves into the regime where the shift reaction occurs with an intimate mixture that assures combustion.

In this case, one of the tubes that impinge onto the thimble would carry the effluent from the underoxidized burner and the other would carry water or steam. The very fast mixing that subsequently occurs lowers temperature to the lower temperature condition for the shift reaction. The overall system would resemble that shown for the two-stage No-$NO_x$ reactor in FIG. 1, except that excess air in the latter is replaced by steam or water.

Note that liquid water is added in this fashion, it will largely flash to steam in the injector. If steam is added, it may be preformed from liquid water by heat exchange with the combustion gases before entering the mixing injector, in the same manner used to preheat air or air/fuel mixtures.

Previous discussions above suggested means to add water downstream of the underoxidized burner to effect the shift reaction between $H_2O$ and CO, etc., and use means that resulted in very rapid mixing. Where very fast mixing is not required of the underoxidized burner, then the primary need is to quench the effluent to temperatures where the disproportioning reaction, $2CO = C + CO_2$, is not likely to occur. Then a downstream catalytic reactor 29 of FIG. 2, may be added downstream to effect the shift reaction between CO and $H_2O$ to from $H_2$ and $CO_2$—which is included with most reformers.

Figure 7:
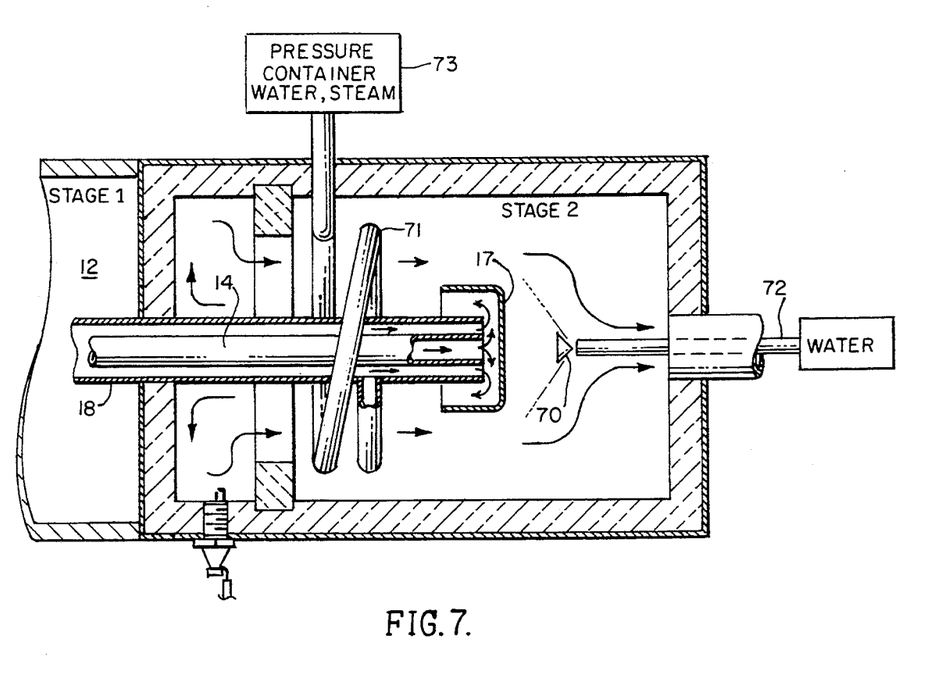
FIG. 7 is a view similar to the view of FIG. 2 with the inclusion of water addition.

One means, shown in FIG. 7, injects the liquid water backward into the effluent of the underoxidized burner. Here, the water into a tubular or cone-like sheet. This can be done by a coned member 70 placed in the water stream exiting a tube 72 so that the water tends to form a sheet—much in the manner as when the hollow opening of a spoon inserted into water flowing from a faucet. The resulting flowing lamina provides an excellent heat exchange surface for vaporizing the water, results in a more forceful movement back into the chamber then provided by droplets, and better covers the effluent from the burner.

In FIG. 7, the products of the first (underoxidized) combustor pass into the annulus of the injector leading to the second (overoxidized) burner, and air passes into the tube 14 in the center of the injector. The added air increases the overall air flow rate so the air/fuel ratio stoichiometric ratio of the two burners together is in the normal range, which is greater than unity.

FIG. 7 may also be used with the air replaced with liquid water or steam, to effect the shift reaction ($CO + H_2O = CO_2 + H_2$) and reduce formation of C. The water is normally supplied as liquid from a pump or pressurized container 73. If steam is to be formed from the water, this can be accomplished by a small tubular heat exchanger 71 in the secondary burner 15. The steam so produced is introduced into the annulus or tube leading to the injector.

Still further, it is contemplated that electrolyzed water may be used to produce hydrogen. More product and less costly hydrogen may be produced by using the oxygen product, formed in such water electrolysis, as oxidizer in the place of air to a methane or other hydrocarbon fueled underoxidized burner. Oxygen results in higher $H_2$ percent from the underoxidized burner primarily because the effluent does not contain $N_2$ as diluent.

Therefore, it can be seen that an improved underoxidized burner is disclosed having single or multiple stages of internal combustion utilizing gaseous fuels or liquid fuel for mixture with air and/or electrolyzed water as an oxygen product which is combusted by spark ignition. The air, oxygen product or, in some instances, effluent from previous stages is introduced to a combustion chamber via novel injectors simultaneously with selected fuels. Water may be employed, especially when mixed with effluent gases to produce maximum $H_2$ from the fuels.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an internal combustion apparatus, the combination which comprises;
   a burner means having at least one internal combustion chamber for combusting air and hydrocarbon fuels at fuel-rich stoichiometric air/fuel ratios within the range from 0.25 to 1.0 to provide air/fuel vapors;
   injector means disposed in said burner means for separately introducing air and fuel into said combustion chamber;
   said injector means includes an air inlet tube and a fuel inlet tube having open ends terminating in close proximity with respect to each other;
   a cup-like thimble disposed about said open ends of said air inlet tube and said fuel inlet tube for simultaneously receiving introduced air and fuel;
   said thimble incorporating a flat barrier wall within a continuous sidewall terminating in an edge about said open ends for receiving said introduced air and fuel in forced impingement relationship to create an air/fuel mixture in said combustion chamber.

2. The invention as defined in claim 1 wherein:
   said barrier wall is disposed immediately ahead of said introduced air and fuel for receiving and redirecting said air/fuel mixture to further blend said air/fuel mixture.

3. The invention as defined in claim 1 wherein:
   said air inlet tube and said fuel inlet tube are of different diameters and coaxially disposed with respect to each other and having said terminating open ends equidistant from said barrier wall with said thimble sidewall coaxially disposed about said open ends.

4. The invention as defined in claim 1 wherein:
   said open ends of said air inlet tube and said fuel inlet tube are opposed to one another in spaced-apart relationship and in coextensive relationship; and
   wherein said flat barrier wall comprises a flat baffle disposed between said open ends directly receiving said introduced air and fuel on opposite sides of said flat baffle respectively.

5. The invention as defined in claim 1 including:

a burner wall composed of insulation material surrounding said combustion chamber; and a metal wall enclosing said burner insulation wall.

6. The invention as defined in claim 5 including:

a barrier ring composed of insulation material disposed in said combustion chamber about said thimble to define a passageway of reduced dimension therebetween.

7. The invention as defined in claim 2 including:

a catalytic shift reactor disposed within said combustion chamber responsive to combustion of said air/fuel mixture to produce hydrogen and carbon dioxide.

8. The invention as defined in claim 7 including:

ignition means operably carried on said burner wall in communication with said combustion chamber to ignite said air/fuel mixture.

9. The invention as defined in claim 2 including:

a barrier ring disposed in said combustion chamber about said injector means providing a passageway of reduced dimension as compared with the dimension of said combustion chamber to compress combusted said air/fuel mixture.

* * * * *